(12) United States Patent
Kageyama (10) Patent No.: US 11,002,357 B2
(45) Date of Patent: May 11, 2021

(54) SHIFT DEVICE (71) Applicant: KABUSHIKI KAISHA TOKAI-RIKA-DENKI-SEISAKUSHO, Aichi-ken (JP)

(72) Inventor: Yu Kageyama, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 14 days.

(21) Appl. No.: 16/515,707

(22) Filed: Jul. 18, 2019

(65) Prior Publication Data

US 2020/0032896 A1 Jan. 30, 2020

(30) Foreign Application Priority Data

Jul. 24, 2018 (JP) .............................. JP2018-138555

(51) Int. Cl.
*F16H 59/02* (2006.01)
*B60K 20/02* (2006.01)

(52) U.S. Cl.
CPC ......... *F16H 59/0278* (2013.01); *B60K 20/02* (2013.01); *F16H 2059/026* (2013.01); *F16H 2059/0282* (2013.01)

(58) Field of Classification Search
CPC ........... F16H 59/0278; F16H 2059/026; F16H 2059/2082; G05G 1/025; G05G 5/04
See application file for complete search history.

(56) References Cited

U.S. PATENT DOCUMENTS

| 5,247,849 | A | * | 9/1993 | Sato | ...................... B60Q 1/1476 200/61.88 |
| 5,345,836 | A | * | 9/1994 | Yokoyama | .......... F16H 59/0217 200/61.88 |
| 7,650,812 | B2 | | 1/2010 | Tomida | |
| 2005/0223834 | A1 | * | 10/2005 | Otsuka | ................ F16H 59/0204 74/473.18 |
| 2017/0299049 | A1 | * | 10/2017 | Henion | .................... F16H 59/10 |

FOREIGN PATENT DOCUMENTS

| JP | 10016594 A | * | 1/1998 | ......... F16H 59/0204 |
| JP | 2004-082954 A | | 3/2004 | |
| JP | 2006-051862 A | | 2/2006 | |

* cited by examiner

*Primary Examiner* — Bobby Rushing, Jr.
(74) *Attorney, Agent, or Firm* — Roberts Calderon Safran & Cole P.C.

(57) ABSTRACT

There is provided a shift device including: a shift body whose shift position is altered when the shift body is moved; a moving body that is movably provided at the shift body; an abutting portion that is provided at one of the shift body or the moving body; and a protruding portion that is provided at the other of the shift body or the moving body, and in which groove portions are provided between plural protrusions, and that causes movement of the moving body to be stopped when the plural protrusions and the abutting portion abut against each other.

6 Claims, 7 Drawing Sheets

SHIFT DEVICE

CROSS-REFERENCE TO RELATED APPLICATION

This application is based on and claims priority under 35 USC 119 from Japanese Patent Application No. 2018-138555 filed on Jul. 24, 2018, the disclosure of which is incorporated by reference herein.

BACKGROUND

Technical Field

The present disclosure relates to a shift device in which a shift position is altered as a result of a shift body being moved.

Related Art

In a shift lever described in Japanese Unexamined Patent Application (JP-A) No. 2004-82954, a knob button is movably provided on a shift knob. Movement of the knob button is stopped when the shift knob and the knob button abut against each other.

Here, it is preferable that, in this type of shift lever, when the movement of the knob button has stopped, the knob button is inhibited from adhering to the shift knob.

SUMMARY

The present disclosure was conceived in view of the above-described circumstances, and the present disclosure provides a shift device that enables adhesion of a moving body to a shift body to be inhibited when movement of the moving body has stopped.

A shift device of a first aspect of the present disclosure is provided with a shift body whose shift position is altered when the shift body is moved, a moving body that is movably provided at the shift body, an abutting portion that is provided at one of the shift body or the moving body, and a protruding portion that is provided at the other of the shift body or the moving body, and in which groove portions are provided between plural protrusions, and that causes movement of the moving body to be stopped when the plural protrusions and the abutting portion abut against each other.

A shift device of a second aspect of the present disclosure is provided with a shift body whose shift position is altered when the shift body is moved, a moving body that is movably provided at the shift body, an abutting portion that is provided at one of the shift body or the moving body, and a protruding portion that is provided at the other of the shift body or the moving body, and in which plural groove portions that are open on an outer side of an outer periphery of one side portion are provided adjacently to protrusions, and that causes movement of the moving body to be stopped when the abutting portion and the protrusions abut against each other.

A shift device of a third aspect of the present disclosure is characterized in that, in the shift device according to the first aspect or second aspect of the present disclosure, when the movement of the moving body has stopped, the groove portions are open from an abutment portion where the abutting portion and the protruding portion abut against each other.

A shift device of a fourth aspect of the present disclosure is characterized in that, in the shift device according to any one of the first through third aspects of the present disclosure, the moving body can be made to slide.

A shift device of a fifth aspect of the present disclosure is characterized in that, in the shift device according to any one of the first through fourth aspects of the present disclosure, the protrusions are harder than the abutting portion.

A shift device of a sixth aspect of the present disclosure is characterized in that, in the shift device according to any one of the first through fifth aspects of the present disclosure, an abutting surface of the protrusions that abuts against the other one of the shift body and the moving body is a planar surface.

In the shift device of the first aspect of the present disclosure, when a shift body is moved, the shift position is altered. In addition, a moving body is movably provided at the shift body, and movement of the moving body is stopped when an abutting portion on one of the shift body or the moving body abuts against plural protrusions on a protruding portion on the other one of the shift body or the moving body.

Here, in the protruding portion, groove portions are provided between the plural protrusions. Because of this, when the movement of the moving body has been stopped, the abutment surface area between the abutting portion and the protruding portion can be reduced, and adhesion of the moving body to the shift body can be inhibited.

In the shift device of the second aspect of the present disclosure, the shift position is altered when the shift body is moved. In addition, the moving body is movably provided in the shift body, and movement of the moving body is stopped when the abutting portion of one of the shift body or the moving body abuts against the protrusions on the protruding portion on the other one of the shift body or the moving body.

Here, in the protruding portion, plural groove portions are provided are provided adjacently to the protrusions, and the plural groove portions are open on an outer side of an outer periphery of one side portion of the protruding portion. Because of this, when the movement of the moving body has been stopped, the abutment surface area between the abutting portion and the protruding portion can be reduced by the groove portions, and adhesion of the moving body to the shift body can be inhibited.

In the shift device of the third aspect of the present disclosure, when the movement of the moving body has stopped, the groove portions are open from the abutment portion where the abutting portion and the protruding portion abut against each other. Because of this, the groove portions are inhibited from becoming sealed by the abutment portion between the abutting portion and the protruding portion, so that adhesion of the moving body to the shift body can be effectively inhibited.

In the shift device of the fourth aspect of the present disclosure, the moving body can be made to slide. Because of this, when the moving body is made to slide, as is described above, then when the sliding of the moving body has stopped, adhesion of the moving body to the shift body can be inhibited.

In the shift device of the fifth aspect of the present disclosure, the protrusions are harder than the abutting portion. Because of this, when the movement of the moving body has stopped, the protrusions can be inhibited from being compressed, and the accuracy of the stopping position of the moving body can be improved.

In the shift device of the sixth aspect of the present disclosure, an abutting surface of the protrusions that abuts against the abutting portion is formed having a planar shape.

Because of this, when the movement of the moving body is stopped, compression of the protrusions can be inhibited, and the accuracy of the stopping position of the moving body can be improved.

BRIEF DESCRIPTION OF THE DRAWINGS

An exemplary embodiment will be described in detail with reference to the following figures, wherein.

DETAILED DESCRIPTION

Figure 1A:
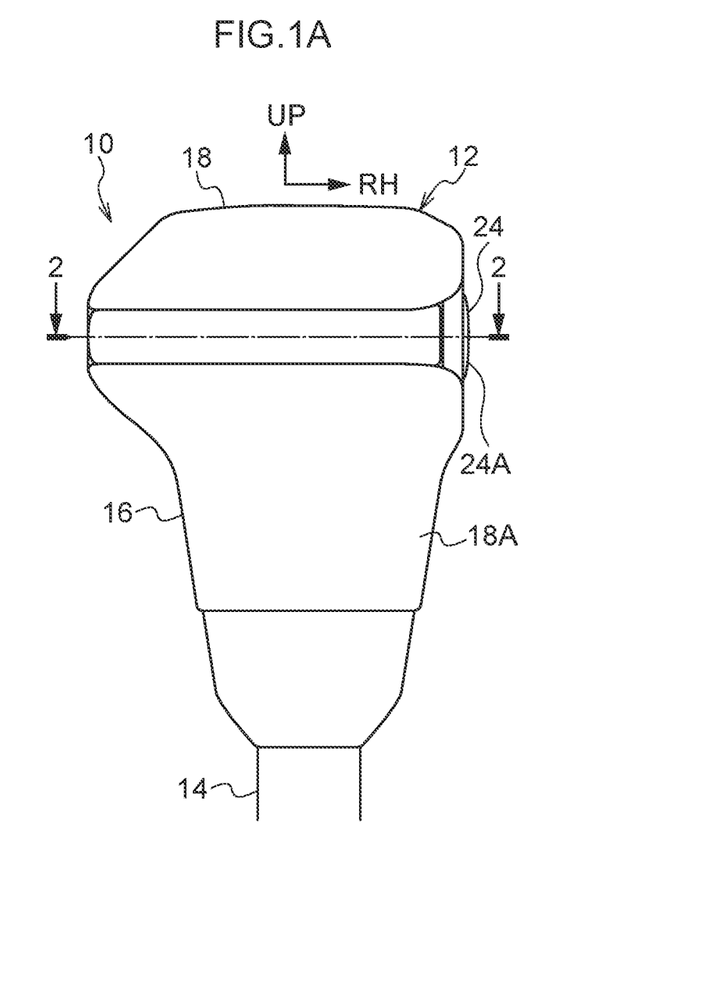
FIG. 1A is a view showing a shift lever of a shift lever device according to an exemplary embodiment of the present disclosure, being a rear view looking from a rear showing the shift lever.
Figure 1B:
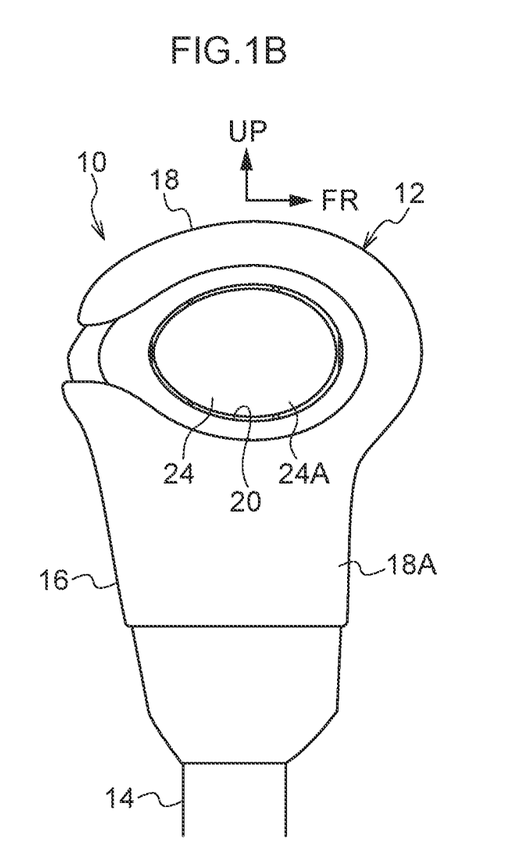
FIG. 1B is a view showing a shift lever of a shift lever device according to an exemplary embodiment of the present disclosure, being a side view looking from a right side showing the shift lever.

In FIG. 1A, principal portions of a shift lever device 10, which is serving as a shift device according to an exemplary embodiment of the present disclosure, are shown in a rear view looking from a rearward direction, and principal portions of the shift lever device 10 are shown in a side view looking from a right side in FIG. 1B. Note that, in each drawing, a front side of the shift lever device 10 is indicated by an arrow FR, a right side of the shift lever device 10 is indicated by an arrow RH, and an upper side of the shift lever device 10 is indicated by an arrow UP.

The shift lever device 10 according to the present exemplary embodiment is disposed on an inner side in a vehicle width direction of a vehicle seat (i.e., a driver's seat), and left-right directions of the shift lever device 10 are arranged so as to be parallel with the vehicle width direction.

As is shown in FIG. 1A and FIG. 1B, the shift lever device 10 is provided with a substantially rod-shaped shift lever 12, which is serving as a shift body. A substantially circular cylinder-shaped lever 14, which is serving as a shift main body, is provided on the shift lever 12, and this lever 14 extends in an up-down direction. The lever 14 is supported at a lower-side portion thereof (i.e., at a base end-side portion thereof) on a vehicle-side supporting body (not shown in the drawings) so as to be able to move rotationally (i.e., move) in a front-rear direction. As a result of the shift lever 12 being rotationally moved in the front-rear direction so that the lever 14 is moved rotationally in the front-rear direction, the shift position of the shift lever 12 is altered between, for example, a [P] (parking) position, an [R] (reverse) position, an [N] (neutral) position, and a [D] (drive) position.

A knob 16, which is serving as a gripping body, is fixed to an upper end portion (i.e., a distal end portion) of the lever 14. The knob 16 is able to be gripped by an occupant of the vehicle (i.e., by a driver), and the shift lever 12 is rotationally moved in the front-rear direction as a result of the knob 16 being gripped by the vehicle occupant and moved rotationally in the front-rear direction.

Figure 1C:
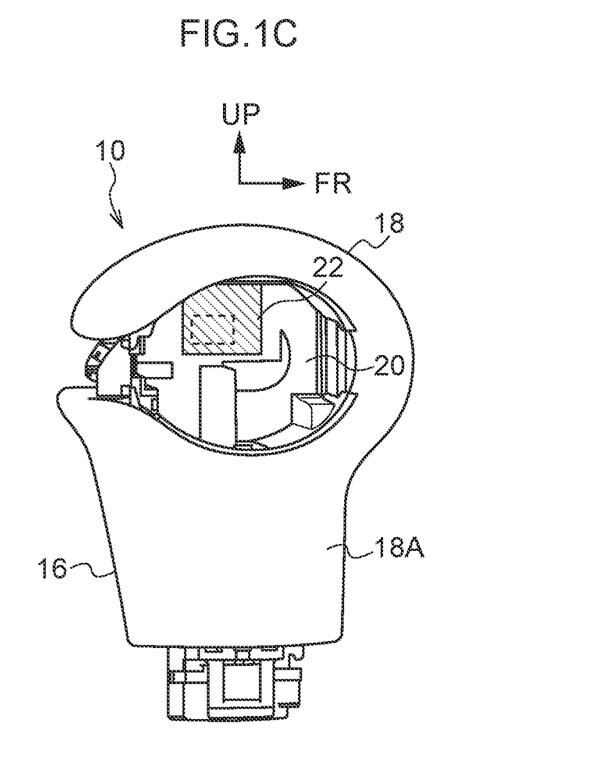
FIG. 1C is a view showing a shift lever of a shift lever device according to an exemplary embodiment of the present disclosure, being a side view looking from the right side showing principal portions of a knob main body of the shift lever.

A knob main body 18, which is serving as a gripping portion, is provided on the knob 16, and the knob 16 is able to be gripped by the vehicle occupant via this knob main body 18. A major portion of an outer peripheral surface of the knob main body 18 is formed as a gripping surface 18A (see FIG. 1C), and this gripping surface 18A is formed from soft resin (for example, from polyvinyl chloride), and is formed via secondary molding around a hard resin that is used to form the knob main body 18.

Figure 2A:
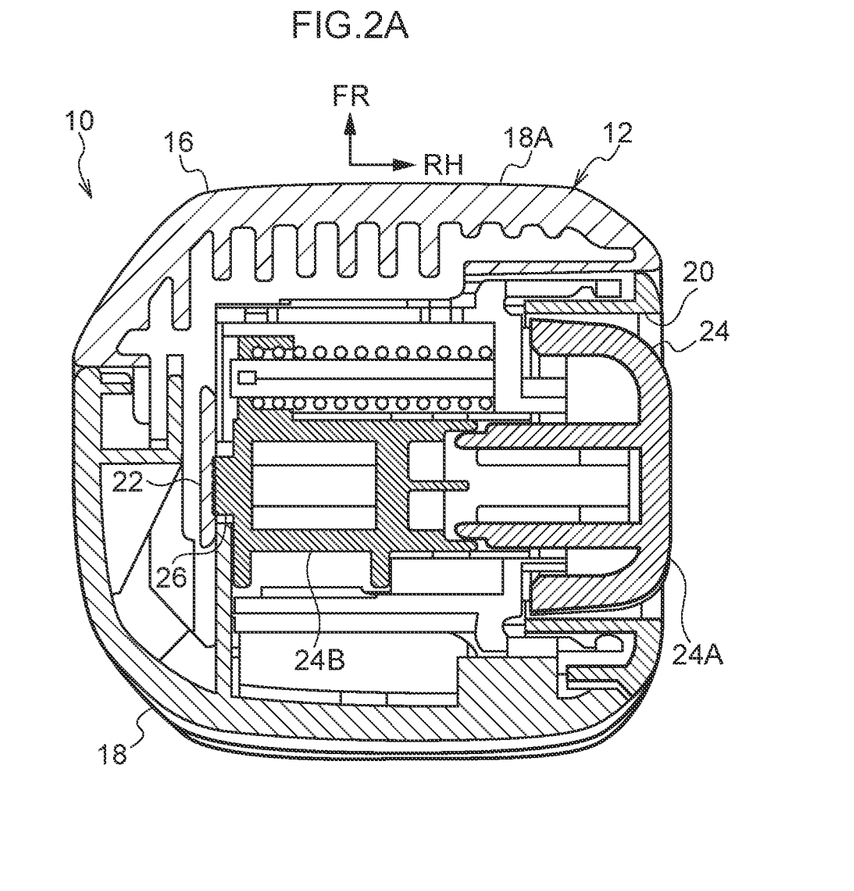
FIG. 2A is a cross-sectional view (taken across a line 2-2 in FIG. 1A) looking from above showing a knob of the shift lever device according to the exemplary embodiment of the present disclosure, showing the entire knob.

A guide hole 20 is formed inside the knob main body 18, and in addition to extending in the left-right direction, the guide hole 20 is also open on the right side (i.e., the seat side, namely, the vehicle occupant side). On the left side of the guide hole 20 there is provided a rectangular-plate shaped stopper 22 (see FIG. 1C and FIG. 2A), which is serving as an abutting portion and a stopping portion. In addition to forming a left surface of the guide hole 20, this stopper 22 is also disposed perpendicularly to the left-right direction. The stopper 22 is formed integrally with the gripping surface 18A of the knob main body 18, and the stopper 22 is formed from the same soft resin material as the gripping surface 18A.

Figure 3:
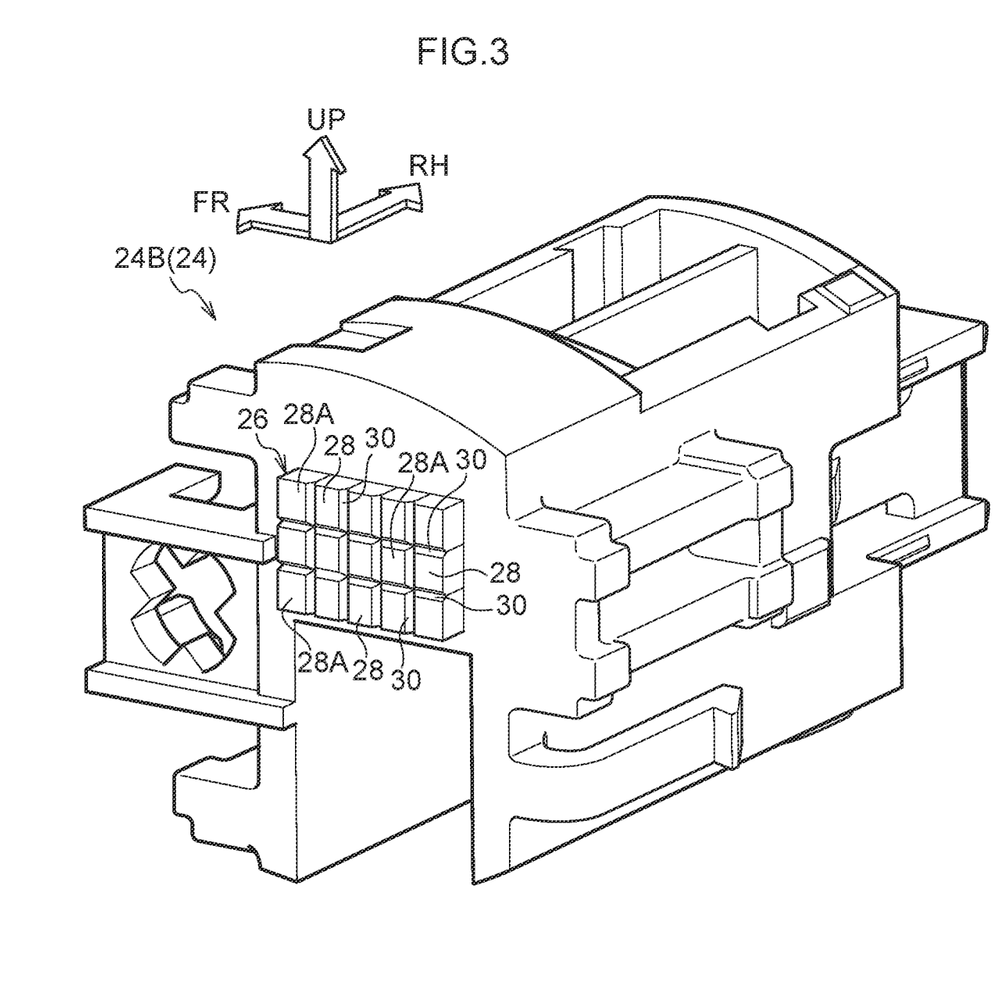
FIG. 3 is a perspective view looking diagonally from a rear-left direction showing a button main body of the shift lever device according to the exemplary embodiment of the present disclosure.

A substantially column-shaped button 24 (see FIG. 2A), which is serving as a moving body and an operating body, is provided inside the guide hole 20, and this button 24 is able to slide (i.e., move) within a predetermined range in the left-right direction while being guided by the guide hole 20. A cover button 24A which is substantially in the shape of a circular cylinder having one closed end is provided at a right side portion of the button 24. A right surface of the cover button 24A is closed off, and is exposed to the right side from the guide hole 20. A substantially rectangular-parallelepiped shaped button main body 24B (see FIG. 3) is provided at a left side portion of the button 24, and the button main body 24B is formed from a hard resin (for example, from polybutylene terephthalate). The cover button 24A is fixed to the button main body 24B, and the button main body 24B is able to slide in the left-right direction integrally with the cover button 24A.

The button 24 is urged towards the right, and the button 24 (i.e., the cover button 24A) protrudes towards the right from the guide hole 20 in the knob main body 18. The button 24 (i.e., the cover button 24A) can be operated by being pressed towards the left by the vehicle occupant. The button 24 is pressed towards the left and is thereby made to slide towards the left in resistance to urging force (see FIG. 1A and FIG. 1B, and FIG. 2A).

A substantially rectangular-column shaped protruding portion 26 (see FIG. 2A and FIG. 3) is formed integrally with a left surface of the button main body 24B of the button 24, and the protruding portion 26 protrudes towards the left. Plural (15 in the present exemplary embodiment) protrusions 28 are formed on a left end portion (i.e., on a protruding end portion) of the protruding portion 26, and these plural protrusions 28 are arranged in rows in both the front-rear direction and the up-down direction so as to be disposed in a lattice configuration. The protrusions 28 are each formed in a square truncated-cone shape, and the cross-section of each protrusion 28 becomes progressively smaller towards the left side. A left surface (i.e., a protruding end surface) of each protrusion 28 is formed as an abutting surface 28A. Each abutting surface 28A is formed as a rectangular plane, and is disposed so as to be perpendicular relative to the left-right direction. Groove portions 30 are formed on the left end portion of the protruding portion 26 between the respective protrusions 28, and these groove portions 30 open onto the left side. Each groove portion 30 extends in either the front-rear direction or the up-down direction, and the groove portions 30 open onto an outer side of an outer periphery of the protruding portion 26.

Figure 2B:
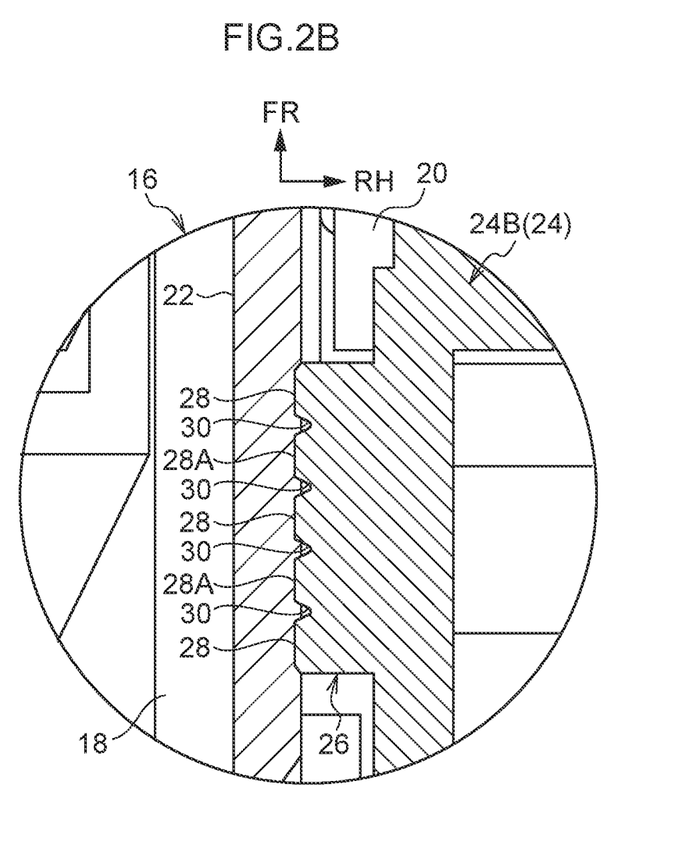
FIG. 2B is a cross-sectional views (taken across a line 2-2 in FIG. 1A) looking from above showing a knob of the shift lever device according to the exemplary embodiment of the present disclosure, showing principal portions of the knob.

When the button 24 is made to slide towards the left, the abutting surfaces 28A of the plural protrusions 28 on the protruding portion 26 abut against the stopper 22 of the knob main body 18, so that the sliding movement towards the left side by the button 24 is stopped. When the sliding movement towards the left side by the button 24 is being stopped, because the stopper 22, which is made from a soft resin, is elastically deformed by the protruding portion 26, which is made from a hard resin, noise generated when the protruding portion 26 abuts against (i.e., strikes against) the stopper 22 is suppressed. Once the sliding movement towards the left side by the button 24 has stopped, even if the plural protrusions 28 and groove portions 30 are pressed into the stopper 22 due to the elastic deformation of the stopper 22, the groove portions 30 remain open (see FIG. 2 (B)) on the outer side of the outer periphery of the protruding portion 26 (i.e., on the outer side of the abutment portion between the plural protrusions 28 and the stopper 22).

The button 24 is connected to a detent mechanism (not shown in the drawings), which is serving as a restricting mechanism, and this detent mechanism restricts a predetermined rotational movement of the shift lever 12 (for example, a rotational movement from the [P] position to the [R] position). After the button 24 has been made to slide towards the left, the detent mechanism then permits the predetermined rotational movement of the shift lever 12.

Next, an operation of the present exemplary embodiment will be described.

In the knob 16 of the shift lever device 10 having the above-described structure, the button 24 is operated by being pressed towards the left by a vehicle occupant so that the button 24 is made to slide towards the left. Furthermore, the abutting surfaces 28A of the plural protrusions 28 on the protruding portion 26 of the button 24 (i.e., of the button main body 24B) abut against the stopper 22 of the knob main body 18, so that the sliding movement towards the left side by the button 24 is stopped.

Here, the groove portions 30 are formed between the protrusions 28 of the protruding portion 26. Because of this, when the sliding movement towards the left side by the button 24 has been stopped, the abutting surface area between the stopper 22 and the protruding portion 26 can be decreased due to these grooves 30 being provided. As a consequence, if, for example, a liquid (for example, water or a lubricating agent such as grease or the like) becomes interposed between the stopper 22 and the protruding portion 26, so that adhesive force is created between the stopper 22 and the protruding portion 26 by the surface tension of this liquid, this adhesive force can be reduced so that adhesion of the button 24 (i.e., the protruding portion 26) to the knob main body 18 (i.e., to the stopper 22) can be inhibited.

Furthermore, once the sliding movement towards the left by the button 24 has been stopped, even if the protruding portion 26 (i.e., the plural protrusions 28 and groove portions 30) are pressed into the stopper 22 due to the elastic deformation of the stopper 22, the groove portions 30 are open on the outer side of the outer periphery of the protruding portion 26. Because of this, it is possible to inhibit the groove portions 30 from being sealed by the stopper 22, so that an inflow path for gas (i.e., air) into the groove portions 30 can be secured. As a consequence, it is easy for the volume of an interposed material (i.e., a liquid or gas) between the stopper 22 and the protruding portion 26 to change, so that any adhesive force acting between the stopper 22 and the protruding portion 26 can be effectively reduced, and adhesion of the button 24 (i.e., the protruding portion 26) to the knob main body 18 (i.e., the stopper 22) can be effectively inhibited.

Moreover, the stopper 22 is formed from a soft resin, while the protruding portion 26 is formed from a hard resin, so that the protruding portion 26 is harder in comparison to the stopper 22. Because of this, once the sliding movement towards the left side by the button 24 has stopped, the groove portions 30 between the protrusions 28 can be inhibited from being blocked due to compression of the protrusions 28 of the protruding portion 26. As a consequence, adhesive force acting between the stopper 22 and the protruding portion 26 can be kept suitably small, and adhesion of the button 24 (i.e., the protruding portion 26) to the knob main body 18 (i.e., the stopper 22) can be suitably inhibited.

In addition, because the button 24 is made to slide towards the left side, when the sliding movement towards the left side by the button 24 is being stopped, the abutting surfaces 28A of the protrusions 28 of the protruding portion 26 abut against the right-side surface of the stopper 22 in a state of being parallel therewith. Because of this, even if the abutting surfaces 28A of the protrusions 28 abut against the right-side surface of the stopper 22 in a state of being parallel therewith when the sliding movement towards the left side by the button 24 is being stopped, as is described above, adhesion of the button 24 (i.e., the protruding portion 26) to the knob main body 18 (i.e., the stopper 22) can be inhibited.

Furthermore, as is described above, the protruding portion 26 is harder in comparison to the stopper 22. Because of this, once the sliding movement towards the left side by the button 24 has stopped, compression of the protrusions 28 of the protruding portion 26 can be inhibited, so that the accuracy of the stopping position when the sliding movement towards the left by the button 24 is stopped can be improved.

In addition, the abutting surfaces 28A of the protrusions 28 are formed as planar surfaces. Because of this, when the sliding movement towards the left side by the button 24 has stopped, compression of the protrusions 28 of the protruding portion 26 can be inhibited even more effectively, so that the accuracy of the stopping position when the sliding movement towards the left by the button 24 is stopped can be further improved.

(First Variant Example)

Figure 4A:
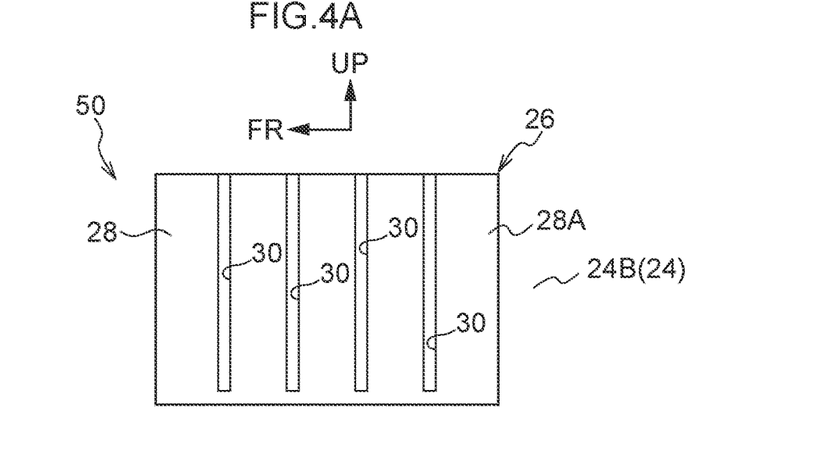
FIG. 4A is a front view looking from a left side showing a protruding portion of a shift lever device according to variant examples of an exemplary embodiment of the present disclosure, showing a protruding portion of a shift lever device according to a first variant example.

The protruding portion 26 of a shift lever device 50, which is serving as a shift device according to a first variant example of the present exemplary embodiment, is shown in a front view looking from a left side in FIG. 4A.

As is shown in FIG. 4A, in the shift lever device 50 according to the present variant example, in the button 24 (i.e. the button main body 24B), a single protrusion 28 is formed on a left end portion (i.e., on a protruding end portion) of the protruding portion 26, and plural (four in the present variant example) groove portions 30 are formed adjacently to the protruding portion 28 in the left end portion of the protruding portion 26. The plural groove portions 30 each extend in the up-down direction, and are arranged side-by-side in the left-right direction. The plural groove portions 30 each open on the outer side of the outer periphery of an upper side portion (i.e. one side portion) from a center of the protrusion 28.

Here, in the present variant example as well, the same action and effects as those obtained from the above-described exemplary embodiment are achieved.

(Second Variant Example)

Figure 4B:
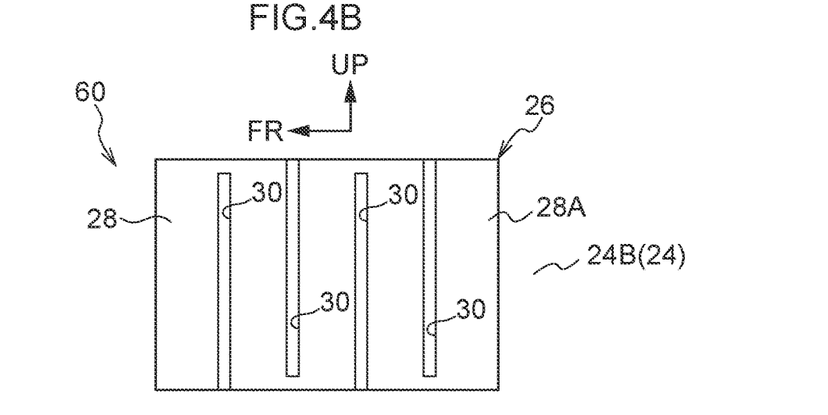
FIG. 4B is a front view looking from a left side showing a protruding portion of a shift lever device according to variant examples of an exemplary embodiment of the present disclosure, showing a protruding portion of a shift lever device according to a second variant example.

The protruding portion 26 of a shift lever device 60, which is serving as a shift device according to a second variant example of the present exemplary embodiment, is shown in a front view looking from a left side in FIG. 4B.

As is shown in FIG. 4B, in the shift lever device 60 according to the present variant example, in the button 24 (i.e. the button main body 24B), a single protrusion 28 is formed on a left end portion (i.e., on a protruding end portion) of the protruding portion 26, and plural (four in the present variant example) groove portions 30 are formed adjacently to the protruding portion 28 in the left end portion of the protruding portion 26. The plural groove portions 30 each extend in the up-down direction, and are arranged side-by-side in the left-right direction in such a way that a portion of the plural groove portions 30 each open on the outer side of the outer periphery of an upper side portion (i.e. one side portion) from a center of the protrusion 28, while another portion of the plural groove portions 30 each open on the outer side of the outer periphery of a lower side portion (i.e. one side portion) from a center of the protrusion 28.

Here, in the present variant example as well, the same action and effects as those obtained from the above-described exemplary embodiment are achieved.

(Third Variant Example)

Figure 4C:
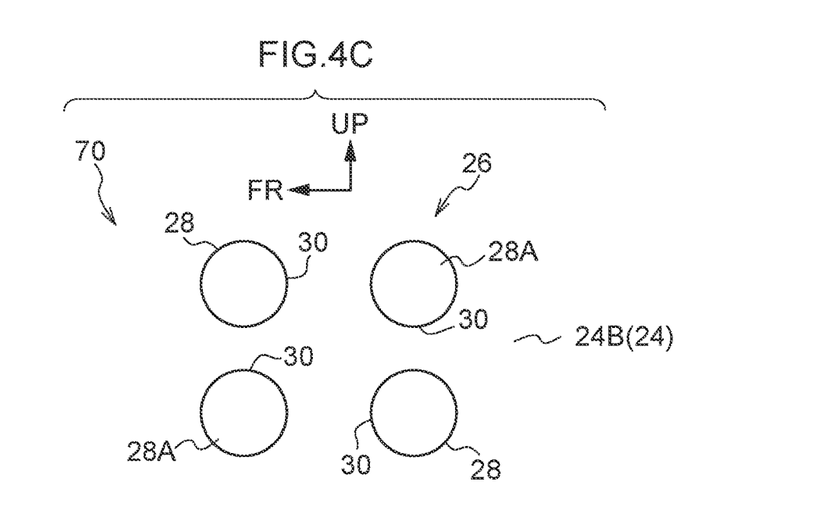
FIG. 4C is a front view looking from a left side showing a protruding portion of a shift lever device according to variant examples of an exemplary embodiment of the present disclosure, showing a protruding portion of a shift lever device according to a third variant example.

The protruding portion 26 of a shift lever device 70, which is serving as a shift device according to a third variant example of the present exemplary embodiment, is shown in a front view looking from a left side in FIG. 4C.

As is shown in FIG. 4C, in the shift lever device 70 according to the present variant example, in the button 24 (i.e. the button main body 24B), plural (three in the present variant example) protrusions 28 are formed extending across the entire protruding portion 26 in the left-right direction thereof (i.e., across the entire protrusion direction), and the protruding portion 26 is formed, for example, in a circular column shape. Groove portions 30 are formed between each protrusion 28 extending across the entire protruding portion 26 in the left-right direction thereof, and the groove portions 30 open on the outer side of the outer periphery of the protruding portion 26.

Here, in the present variant example as well, the same action and effects as those obtained from the above-described exemplary embodiment are achieved.

Note that, in the above described exemplary embodiment (including the first through third variant examples thereof), the abutting surfaces 28A of the protruding portion 26 are formed as planar surfaces. However, it is also possible for the abutting surfaces 28A of the protruding portion 26 to be formed instead as convex surfaces or concave surfaces.

Furthermore, in the above described exemplary embodiment (including the first through third variant examples thereof), the abutting surfaces 28A of the protruding portion 26 and the stopper 22 abut surface-to-surface against each other (i.e., are in surface contact with each other). However, it is also possible for the abutting surfaces 28A of the protruding portion 26 and the stopper 22 to instead abut against each other via an abutting line (i.e., to be in line contact with each other), or to abut against each other via abutting points (i.e., to be in point contact with each other).

Additionally, in the above described exemplary embodiment (including the first through third variant examples thereof), a cross-sectional configuration of the groove portions 30 is either a triangular configuration or rectangular configuration. However, the cross-sectional configuration of the groove portions 30 may be any other type of configuration (for example, a semicircular configuration, an elliptical configuration, or a polygonal configuration of 5 or more sides). Moreover, in the above described exemplary embodiment (including the first and second variant examples thereof), it is also possible for the grooves 30 to be provided so as to extend across the entire protruding portion 26 in the left-right direction thereof (i.e., across the entire protrusion direction).

Furthermore, in the above described exemplary embodiment (including the first through third variant examples thereof), the groove portions 30 are made to extend rectilinearly in an up-down direction or a left-right direction when looked at in a front view. However, it is also possible for the groove portions 30 to instead be inclined relatively to the up-down direction or left-right direction when looked at in a front view, or to be bent or curved when looked at in a front view.

Moreover, in the above described exemplary embodiment (including the first through third variant examples thereof), the stopper 22 is formed from a soft resin, while the protruding portion 26 is formed from a hard resin. However, it is also possible for the stopper 22 to instead be formed from a hard resin, and for the protruding portion 26 to be formed from a soft resin.

In addition, in the above described exemplary embodiment (including the first through third variant examples thereof), the protruding portion 26 is provided on the button 24. However, it is also possible for the protruding portion 26 to instead be provided on the stopper 22.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A shift device comprising:
a shift body whose shift position is altered when the shift body is moved;
a moving body that is movably provided at the shift body;
an abutting portion that is provided at one of the shift body or the moving body; and a protruding portion that is provided at the other of the shift body or the moving body, and in which groove portions are provided between a plurality of protrusions, and that causes movement of the moving body to be stopped when the plurality of protrusions and the abutting portion abut against each other, wherein, when the movement of the moving body has stopped, the groove portions are open from an abutment portion where the abutting portion and the protruding portion abut against each other, and wherein the moving body is configured to slide.

2. A shift device comprising:

a shift body whose shift position is altered when the shift body is moved;

a moving body that is movably provided at the shift body;

an abutting portion that is provided at one of the shift body or the moving body; and a protruding portion that is provided at the other of the shift body or the moving body, and in which a plurality of groove portions that are open on an outer side of an outer periphery of one side portion are provided adjacently to protrusions, and that causes movement of the moving body to be stopped when the abutting portion and the protrusions abut against each other, wherein, when the movement of the moving body has stopped, the groove portions are open from an abutment portion where the abutting portion and the protruding portion abut against each other, and wherein the moving body is configured to slide.

3. The shift device according to claim 1, wherein the protrusions are harder than the abutting portion.

4. The shift device according to claim 2, wherein the protrusions are harder than the abutting portion.

5. The shift device according to claim 1, wherein an abutting surface of the protrusions that abuts against the abutting portion is a planar surface.

6. The shift device according to claim 2, wherein an abutting surface of the protrusions that abuts against the abutting portion is a planar surface.

\* \* \* \* \*